(12) United States Patent
Tashiro et al.

(10) Patent No.: US 10,199,813 B2
(45) Date of Patent: Feb. 5, 2019

(54) FIXING STRUCTURE AND ELECTRICAL CONNECTION BOX

(71) Applicants: Yazaki Corporation, Tokyo (JP); TOYOTA JIDOSHA KABUSHIKI KAISHA, Toyota-shi, Aichi-ken (JP)

(72) Inventors: Hiroki Tashiro, Shizuoka (JP); Nobutaka Kaneko, Shizuoka (JP); Fumiyoshi Ohashi, Shizuoka (JP); Kouji Yonezu, Okazaki (JP); Yuya Yoshikawa, Toyota (JP)

(73) Assignees: YAZAKI CORPORATION, Minato-ku, Tokyo (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/722,024

(22) Filed: Oct. 2, 2017

(65) Prior Publication Data

US 2018/0102635 A1    Apr. 12, 2018

(30) Foreign Application Priority Data

Oct. 6, 2016   (JP) ................................. 2016-198283

(51) Int. Cl.
    *H02G 3/08*    (2006.01)
    *B60R 16/02*   (2006.01)
    *B60R 16/023*  (2006.01)
    *H02G 3/10*    (2006.01)

(52) U.S. Cl.
    CPC ............... *H02G 3/08* (2013.01); *B60R 16/02* (2013.01); *B60R 16/0238* (2013.01); *H02G 3/10* (2013.01)

(58) Field of Classification Search
    CPC .................................. H02G 3/08; B60R 16/02
    USPC .................................. 174/72 A, 50, 51, 68.1
    See application file for complete search history.

(56) References Cited

U.S. PATENT DOCUMENTS 5,608,611 A * 3/1997 Szudarek ............ B60R 16/0239
                                                   174/138 G

FOREIGN PATENT DOCUMENTS

| JP | 55-065706 A | 5/1980 |
| JP | 4-031305 U | 3/1992 |
| JP | 11-311219 A | 11/1999 |
| JP | 2003329027 A | 11/2003 |

(Continued)

OTHER PUBLICATIONS

Communication dated Oct. 30, 2018, from Japanese Office Action in counterpart application No. 2016-198283.

*Primary Examiner* — Dhiru R Patel

(74) *Attorney, Agent, or Firm* — Sughrue Mion, PLLC

(57) ABSTRACT

A fixing structure includes an attaching portion, a nut, and a spacer. The attaching portion has an attaching hole through which an attaching bolt provided to a vehicle body is inserted. The nut fixes the attaching portion to the vehicle body by being tightened to the attaching bolt with a washer interposed between the nut and the attaching portion. The spacer is disposed between an inner circumferential surface of the attaching hole and an outer circumferential surface of the attaching bolt, and is in contact with the vehicle body and the washer in an axial direction of the attaching bolt in a state where the attaching bolt and the nut are tightened. The spacer has an opening on a cylindrical side surface thereof and is capable of rotating around the axial direction of the attaching bolt in a state where the attaching bolt is inserted into the opening.

5 Claims, 12 Drawing Sheets

(56) References Cited

FOREIGN PATENT DOCUMENTS

| JP | 2011-078264 A | 4/2011 |
| JP | 2012167523 A | 9/2012 |

\* cited by examiner

FIG.1
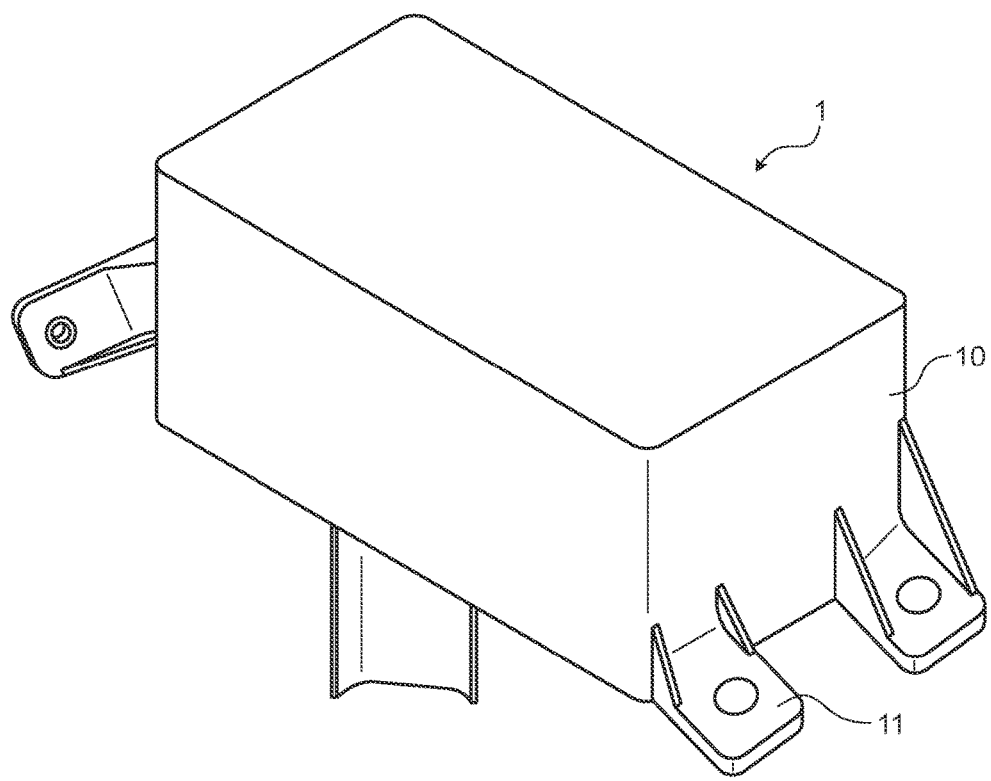
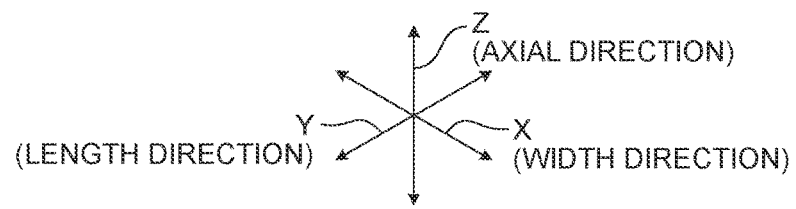

FIG.13
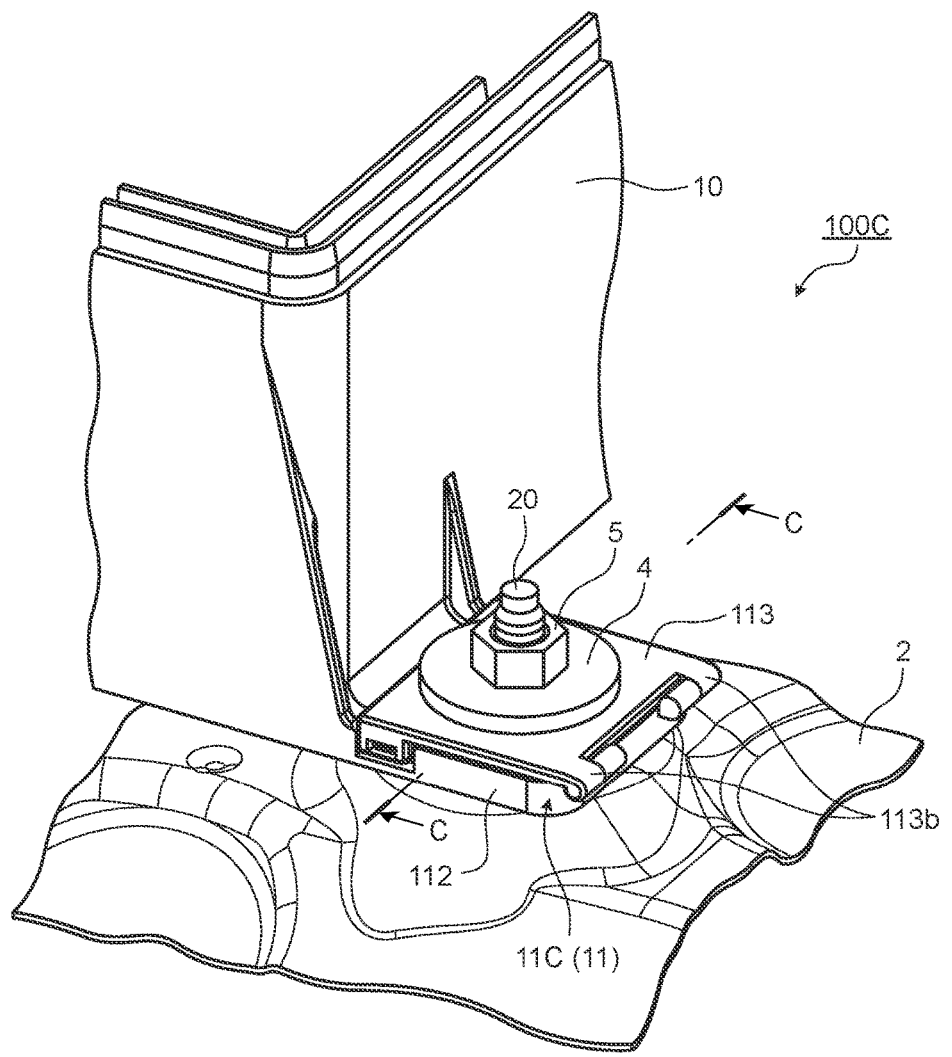
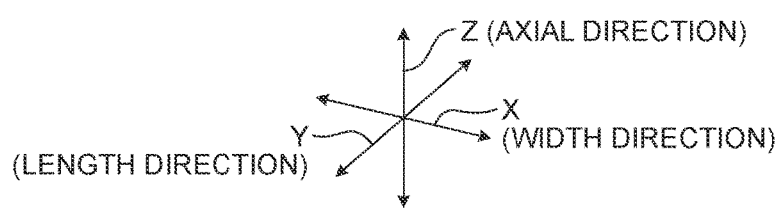

FIXING STRUCTURE AND ELECTRICAL CONNECTION BOX

CROSS-REFERENCE TO RELATED APPLICATION(S)

The present application claims priority to and incorporates by reference the entire contents of Japanese Patent Application No. 2016-198283 filed in Japan on Oct. 6, 2016.

BACKGROUND OF THE INVENTION

1. Field of the Invention

The present invention relates to a fixing structure and an electrical connection box.

2. Description of the Related Art

Electrical connection boxes (also called junction boxes, fuse boxes, or relay boxes) have been known that are mounted on vehicles such as automobiles and collectively house therein connection processing parts such as wire harnesses and electric components such as fuses, relays, and electric control units. The electrical connection boxes are made of resin materials having insulation property and fixed to vehicle bodies with various fixing structures (e.g., refer to Japanese Patent Application Laid-open No. 2011-78264 and Japanese Patent Application Laid-open No. 11-311219).

An example of such electrical connection boxes is provided with an attaching hole having an inner diameter (hole diameter) larger than that of a typical fixing hole taking into consideration a tolerance of an attaching position on a vehicle body. The electrical connection box, thus, uses a wide plain washer for an attaching portion thereof, for example.

When a soft member made of such as a synthetic resin or rubber is fixed with a screw inserted into a through hole provided to the soft member, a metallic sleeve having the same length as the thickness of the soft member is inserted in the through hole or a flanged collar or a flanged bolt is used for preventing buckling of a seating surface of the soft member and for obtaining axial force (e.g., refer to Japanese Patent Application Laid-open No. 55-65706 and Japanese Utility Model Application Laid-open No. 4-31305).

The electrical connection box provided with the attaching portion having an attaching hole the diameter of which is larger than that of a typical attaching hole hardly obtains sufficient axial force due to the bending of the plain washer or the neck of the attaching bolt when the attaching bolt and a nut are tightened even when the wide plain washer is used. There is room for improvement for the electrical connection box to obtain sufficient axial force.

SUMMARY OF THE INVENTION

In view of the aforementioned problems, the present invention is to provide a fixing structure and an electrical connection box capable of preventing axial force reduction in a tightened portion even when a hole diameter of an attaching hole is large.

In order to solve the above mentioned problem and achieve the object, a fixing structure according to one aspect of the present invention includes an attaching portion that has an attaching hole through which an attaching bolt provided to an attaching target is inserted; a nut that is tightened to the attaching bolt with a washer interposed between the nut and the attaching portion to fix the attaching portion to the attaching target; and a spacer that is disposed between an inner circumferential surface of the attaching hole and an outer circumferential surface of the attaching bolt, and is in contact with the attaching target and the washer in an axial direction of the attaching bolt in a state where the attaching bolt and the nut are tightened, wherein the spacer has an opening on a cylindrical side surface thereof and is capable of rotating around the axial direction of the attaching bolt in a state where the attaching bolt is inserted into the opening.

According to another aspect of the present invention, in the fixing structure, it is preferable that the spacer has the opening formed in a U-shape.

According to still another aspect of the present invention, in the fixing structure, it is preferable that the spacer has a rolling bearing on at least one of a cylindrical inner circumferential surface and a cylindrical outer circumferential surface thereof, and rotates around the axial direction of the attaching bolt with the rolling bearing interposed between the spacer and the attaching bolt.

A fixing structure according to still another aspect of the present invention includes an attaching portion that has an attaching hole through which an attaching bolt provided to an attaching target is inserted; a nut that is tightened to the attaching bolt with a washer interposed between the nut and the attaching portion to fix the attaching portion to the attaching target; and a pair of spacers that are arranged at positions facing each other in a horizontal direction perpendicular to an axial direction of the attaching bolt with the attaching bolt interposed between the spacers, and are supported such that the spacers are capable of moving in directions facing each other, wherein each of the spacers includes: a collar portion that is disposed between an inner circumferential surface of the attaching hole and an outer circumferential surface of the attaching bolt, and is in contact with the attaching target and the washer in the axial direction of the attaching bolt in a state where the attaching bolt and the nut are tightened; and an extending portion that extends in a direction to a side opposite the attaching bolt and protrudes outside the attaching portion, and each collar portion has a curved surface in a mutually opposed direction, the curved surface abutting the outer circumferential surface of the attaching bolt along the outer circumferential surface.

An electrical connection box according to still another aspect of the present invention includes a housing; an attaching portion that is protruded from the housing and has an attaching hole through which an attaching bolt provided to an attaching target is inserted; a nut that is tightened to the attaching bolt with a washer interposed between the nut and the attaching portion to fix the attaching portion to the attaching target; and a spacer that is disposed between an inner circumferential surface of the attaching hole and an outer circumferential surface of the attaching bolt, and is in contact with the attaching target and the washer in an axial direction of the attaching bolt in a state where the attaching bolt and the nut are tightened, wherein the spacer has an opening on a cylindrical side surface thereof and is capable of rotating around the axial direction of the attaching bolt in a state where the attaching bolt is inserted into the opening.

An electrical connection box according to still another aspect of the present invention includes a housing; an attaching portion that is protruded from the housing and has an attaching hole through which an attaching bolt provided to an attaching target is inserted; a nut that is tightened to the attaching bolt with a washer interposed between the nut and the attaching portion to fix the attaching portion to the attaching target; and a pair of spacers that are arranged at positions facing each other in a horizontal direction perpendicular to an axial direction of the attaching bolt with the attaching bolt interposed between the spacers, and are supported such that the spacers are capable of moving in directions facing each other, wherein each of the spacers includes: a collar portion that is disposed between an inner circumferential surface of the attaching hole and an outer circumferential surface of the attaching bolt, and is in contact with the attaching target and the washer in the axial direction of the attaching bolt in a state where the attaching bolt and the nut are tightened; and an extending portion that extends in a direction to a side opposite the attaching bolt and protrudes outside the attaching portion, and each collar portion has a curved surface in a mutually opposed direction, the curved surface abutting the outer circumferential surface of the attaching bolt along the outer circumferential surface.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a perspective view illustrating a schematic structure of an electrical connection box to which a fixing structure according to a first embodiment is applied;

FIG. 13 is a perspective view illustrating the schematic structure of the fixing structure according to the third embodiment;

DETAILED DESCRIPTION OF THE PREFERRED EMBODIMENTS

The following describes embodiments according to the invention in detail with reference to the accompanying drawings. The invention, however, is not limited to the following embodiments. The constituent elements of the following embodiments include elements that can be easily replaced by persons skilled in the art or that are substantially the same as the elements known by those in the art. Various omissions, substitutions, and changes of the constituent elements of the following embodiments described herein may be made without departing from the spirit of the invention.

First Embodiment

Figure 2:
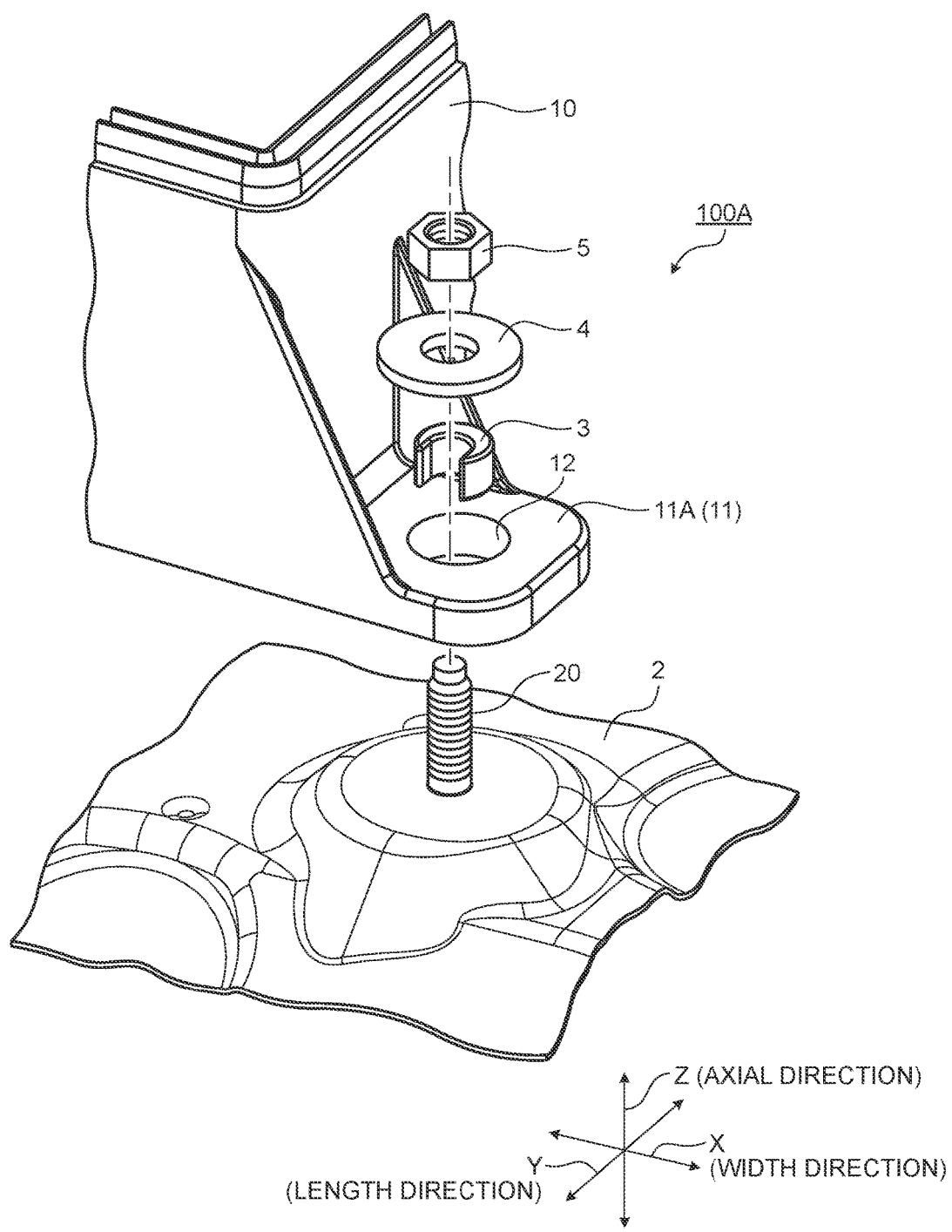
FIG. 2 is an exploded perspective view illustrating a schematic structure of the fixing structure according to the first embodiment.
Figure 3:
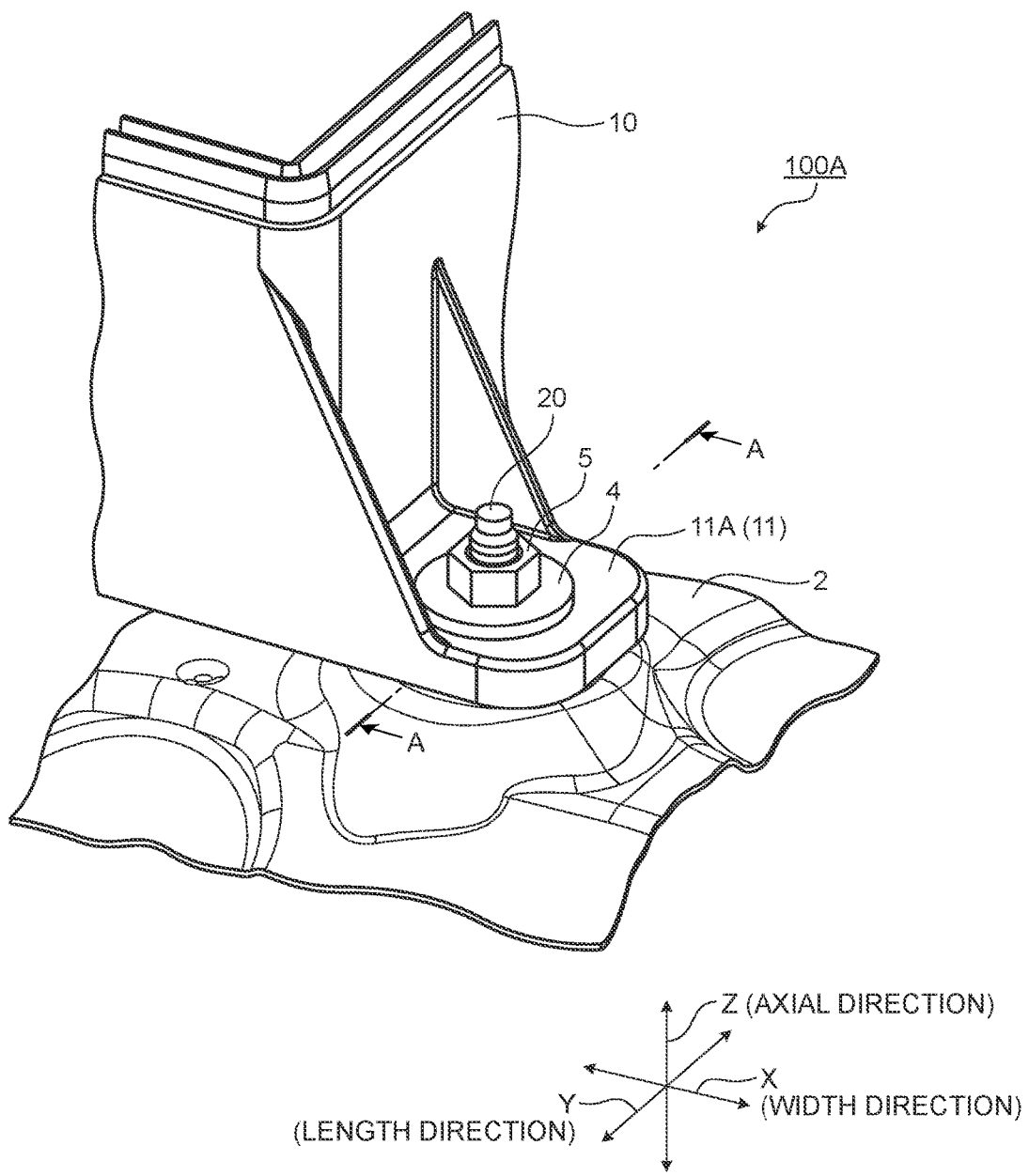
FIG. 3 is a perspective view illustrating the schematic structure of the fixing structure according to the first embodiment.
Figure 4:
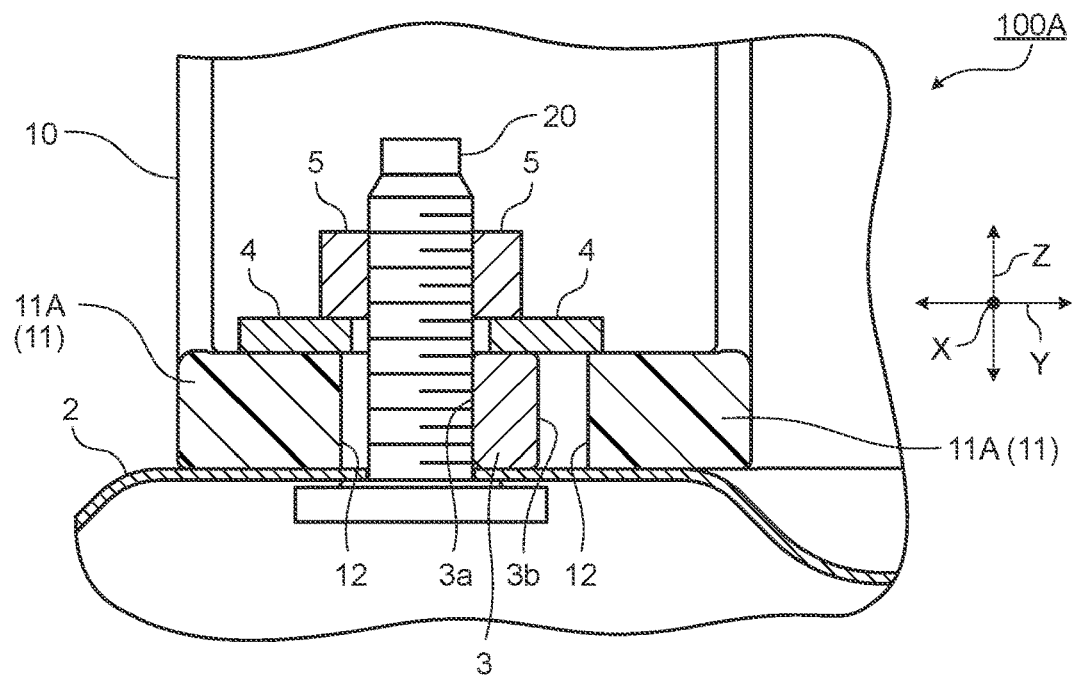
FIG. 4 is a sectional view illustrating the schematic structure of the fixing structure according to the first embodiment.
Figure 5:
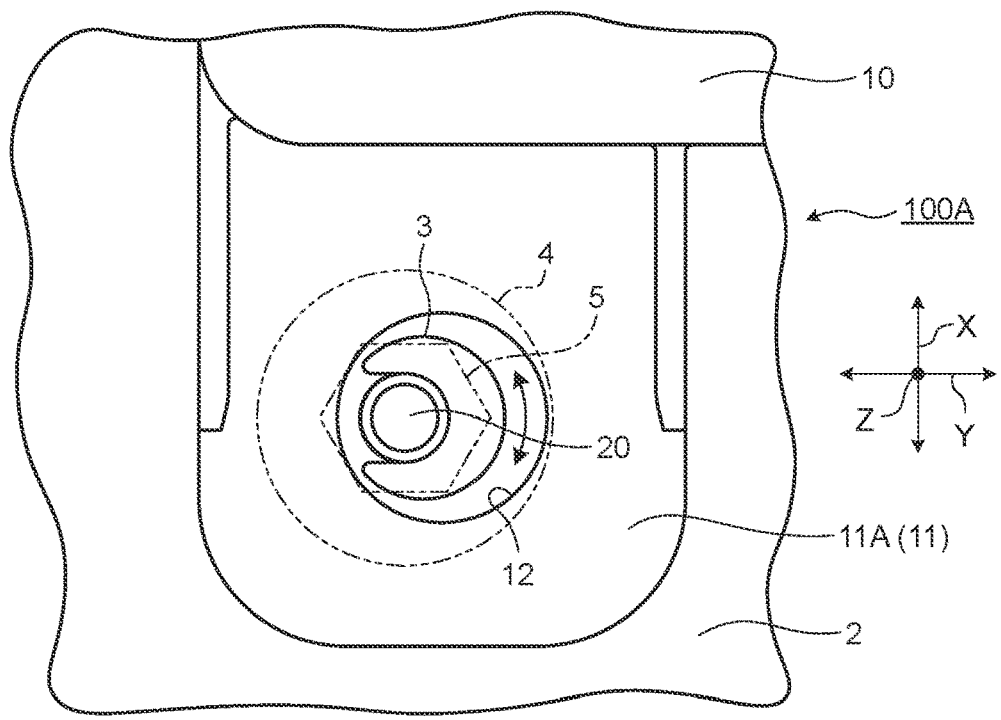
FIG. 5 is a plan view illustrating the schematic structure of the fixing structure according to the first embodiment.
Figure 6:
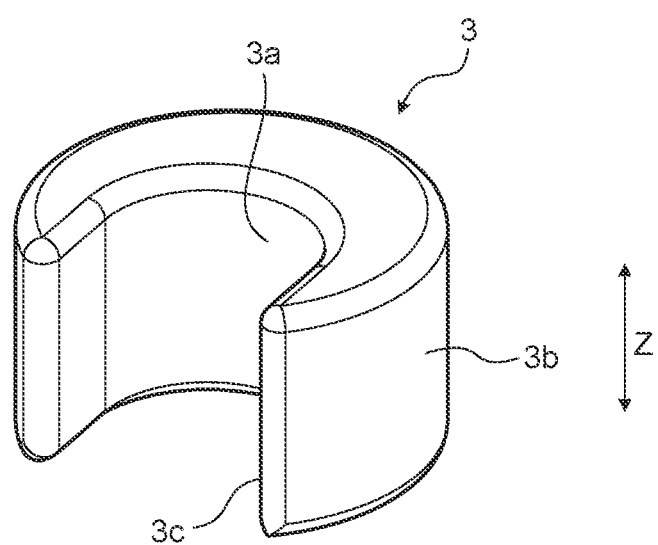
FIG. 6 is a perspective view illustrating a schematic structure of a spacer according to the first embodiment.

With reference to FIGS. 1 to 6, the following describes a fixing structure and an electrical connection box according to a first embodiment. FIG. 1 is a perspective view illustrating a schematic structure of the electrical connection box to which the fixing structure according to the first embodiment is applied. FIG. 2 is an exploded perspective view illustrating a schematic structure of the fixing structure according to the first embodiment. FIG. 3 is a perspective view illustrating the schematic structure of the fixing structure according to the first embodiment. FIG. 4 is a sectional view illustrating the schematic structure of the fixing structure according to the first embodiment. FIG. 5 is a plan view illustrating the schematic structure of the fixing structure according to the first embodiment. FIG. 6 is a perspective view illustrating a schematic structure of a spacer according to the first embodiment. FIG. 4 is a sectional view along line A-A of FIG. 3. FIG. 5 is a schematic diagram illustrating the fixing structure according to the first embodiment viewed from an axial direction of an attaching bolt. In FIG. 5, the attaching bolt and a washer are illustrated with two-dot chain lines.

In the following description, the Z direction in each of FIGS. 1 to 6 is also described as the "axial direction" of an attaching bolt 20 provided to a vehicle body 2. The X direction, which is one of horizontal directions perpendicular to the Z direction, is an "extending direction" along which an attaching portion 11 protruded from a housing 10 of an electrical connection box 1 extends. The X direction is also described as a "width direction". The Y direction perpendicular to the Z direction and the X direction is also described as a "length direction". The "axial direction" is not limited to the vertical direction. The X, Y, and Z directions in FIGS. 7 to 15, which are described later, are defined in the same manner as described above.

A fixing structure 100A according to the first embodiment is applied to the electrical connection box 1 mounted on vehicles such as automobiles, for example. The electrical connection box 1 collectively houses therein connection processing parts such as wire harnesses and electric components such as fuses, relays, and electronic control units. The electrical connection box 1 is attached and fixed to the vehicle body 2 inside an engine room of a vehicle, for example. As illustrated in FIG. 1, the electrical connection box 1 includes the housing 10 made of a synthetic resin and the multiple attaching portions 11. The housing 10 houses the parts and electric components described above. The attaching portions 11, which serve as the attaching portions of the electrical connection box 1, are fixed to the vehicle body 2. In FIG. 1, a cover of the housing 10 is omitted to be illustrated.

As illustrated in FIGS. 2 to 5, the fixing structure 100A includes an attaching portion 11A (11), a spacer 3, a washer 4, and a nut 5.

The attaching portion 11A (11) is a bracket formed by being protruded from an outside surface of the housing 10. The attaching portion 11A (11) is attached to the vehicle body 2 serving as an attaching target. The attaching portion 11A (11) has an attaching hole 12 that is a through hole in the axial direction, that is, the thickness direction. The attaching bolt 20 provided to the vehicle body 2 is inserted through the attaching hole 12. The attaching hole 12 has an inner diameter (hole diameter) formed so as to absorb a position shift of the attaching bolt 20 due to a tolerance of an attaching position to the vehicle body 2, as described above. The attaching hole 12, thus, allows the attaching bolt 20 inserting through the attaching hole 12 to move in the horizontal direction. The attaching hole 12 is what is called a loose hole. The attaching portion 11A (11) in the embodiment is fixed to the vehicle body 2 in such a manner that the nut 5 is tightened to the attaching bolt 20 with the washer 4 interposed between the nut 5 and the attaching portion 11A (11) in a state where the attaching bolt 20 is inserted through the attaching hole 12.

The spacer 3, which is made of a metal such as steel or an aluminum alloy or a synthetic resin, is disposed between an inner circumferential surface of the attaching hole 12 and an outer circumferential surface of the attaching bolt 20. The position of the attaching portion 11A (11) can be adjusted in the horizontal direction in a state where the attaching bolt 20 is inserted through the attaching hole 12, as described above. The spacer 3 is, thus, formed in a falcate shape viewed from the axial direction of the attaching bolt 20 taking into consideration a case where the attaching bolt 20 is off-centered on the outer circumferential side of the attaching hole 12. Unlike a typical insert collar, a part of the cylindrical side surface of the spacer 3 is open, and the thickness in the radial direction of the spacer 3 is continuously changed from a thin portion to a thick portion, and to a thin portion in a circumferential direction of the spacer 3. The spacer 3 in the embodiment is disposed between the inner circumferential surface of the attaching hole 12 and the outer circumferential surface of the attaching bolt 20, and is in contact with the vehicle body 2 and the washer 4 in the axial direction of the attaching bolt 20 in a state where the attaching bolt 20 and the nut 5 are tightened. As illustrated in FIG. 6, the spacer 3 has an inner circumferential surface 3a, an outer circumferential surface 3b, and an opening 3c. The inner circumferential surface 3a is in contact with at least the outer circumferential surface of the attaching bolt 20 in a state where the attaching bolt 20 and the nut 5 are tightened. The outer circumferential surface 3b is in contact with at least the inner circumferential surface of the attaching hole 12 in a state where the attaching bolt 20 and the nut 5 are tightened. The opening 3c is formed in a U-shape. The attaching bolt 20 is inserted into the opening 3c. The spacer 3 in the embodiment has the opening 3c on the cylindrical side surface thereof and is capable of rotating around the axial direction of the attaching bolt 20 in a state where the attaching bolt 20 is inserted into the opening 3c.

The washer 4 is a metallic washer having an annular shape. The washer 4 protects a seating surface on the attaching portion 11A (11), maintains axial force generated by the nut 5, and firmly fixes the attaching portion 11A (11) to the vehicle body 2. The washer 4 in the embodiment preferably has a wide plane for achieving a stable seating surface because the hole diameter of the attaching hole 12 of the attaching portion 11A (11) is larger than the bolt diameter of the attaching bolt 20 so as to absorb variances in manufacturing.

The nut 5 is a metallic hexagonal nut. The nut 5 fixes the attaching portion 11A (11) to the vehicle body 2 by being tightened to the attaching bolt 20 with the washer 4 interposed between the nut 5 and the attaching portion 11A (11).

In the fixing structure 100A and the electrical connection box 1, the spacer 3 is disposed in a space between the inner circumferential surface of the attaching hole 12 and the outer circumferential surface of the attaching bolt 20, and is in contact with the vehicle body 2 and the washer 4 in the axial direction of the attaching bolt 20 in a state where the attaching bolt 20 and the nut 5 are tightened. As a result, the spacer 3 can firmly receive the axial force generated when the nut 5 is tightened along the axial direction of the attaching bolt 20 while the hole diameter of the attaching hole 12 is large. This structure can prevent axial force reduction in a tightened portion due to the bending taking place in at least one of the washer 4 and the neck of the attaching bolt 20 (e.g., the bottom surface of the head of the attaching bolt 20). In addition, this structure can reduce buckling of the seating surface around the attaching hole 12.

In the fixing structure 100A applied to the electrical connection box 1, the spacer 3 has the opening on the cylindrical side surface, and has a thickness in its radial direction continuously changed from a thin portion to a thick portion, and to a thin portion in the circumferential direction thereof. This structure makes it possible for the spacer 3 to be in contact with the washer 4 in the axial direction of the attaching bolt 20 of the vehicle body 2 in a state where the attaching bolt 20 and the nut 5 are tightened even when the attaching bolt 20 is off-centered on the outer circumferential side of the attaching hole 12. As a result, this structure can prevent the axial force reduction in the tightened portion and the buckling of the seating surface around the attaching hole 12. The spacer 3 is capable of rotating around the axial direction of the attaching bolt 20 in a state where the spacer 3 is inserted into the attaching hole 12, thereby rotating in the arrow direction illustrated in FIG. 5 in accordance with a change in degree of the position shift between the attaching bolt 20 and the attaching hole 12. As a result, workability in assembly is improved.

The fixing structure 100A described above includes the attaching portion 11A (11), the nut 5, and the spacer 3. The attaching portion 11A (11) has the attaching hole 12 through which the attaching bolt 20 provided to the vehicle body 2 is inserted. The nut 5 fixes the attaching portion 11A (11) to the vehicle body 2 by being tightened to the attaching bolt 20 with the washer 4 interposed between the nut 5 and the attaching portion 11A (11). The spacer 3 is disposed between the inner circumferential surface of the attaching hole 12 and the outer circumferential surface of the attaching bolt 20, and is in contact with the vehicle body 2 and the washer 4 in the axial direction of the attaching bolt 20 in a state where the attaching bolt 20 and the nut 5 are tightened. The spacer 3 has the opening 3c on the cylindrical side surface thereof and is capable of rotating around the axial direction of the attaching bolt 20 in a state where the attaching bolt 20 is inserted into the opening 3c.

The fixing structure 100A thus structured allows the spacer 3 to firmly receive the axial force generated when the nut 5 is tightened along the axial direction of the attaching bolt 20 even when the hole diameter of the attaching hole 12 is large, thereby making it possible to prevent the axial force reduction in the tightened portion due to the bending of the washer 4, for example. In addition, it is unnecessary to newly provide a special nut having a wide width across flats or reinforce the neck of the attaching bolt 20 to prevent the axial force reduction in the tightened portion and the buckling of the seating surface on the attaching portion 11A (11), thereby making it possible to prevent an increase in cost.

The fixing structure 100A includes the spacer 3 having the opening 3c formed in a U-shape, thereby making it possible to assemble the spacer 3 from a side adjacent to the side surface of the attaching bolt 20. As a result, workability in assembly is improved.

The electrical connection box 1 described above includes the housing 10, the attaching portion 11A (11), the nut 5, and the spacer 3. The attaching portion 11A (11) is protruded from the housing 10 and has the attaching hole 12 through which the attaching bolt 20 provided to the vehicle body 2 is inserted. The nut 5 fixes the attaching portion 11A (11) to the vehicle body 2 by being tightened to the attaching bolt 20 with the washer 4 interposed between the nut 5 and the attaching portion 11A (11). The spacer 3 is disposed between the inner circumferential surface of the attaching hole 12 and the outer circumferential surface of the attaching bolt 20, and is in contact with the vehicle body 2 and the washer 4 in the axial direction of the attaching bolt 20 in a state where the attaching bolt 20 and the nut 5 are tightened. The spacer 3 has the opening 3c on the cylindrical side surface thereof and is capable of rotating around the axial direction of the attaching bolt 20 in a state where the attaching bolt 20 is inserted into the opening 3c.

The electrical connection box 1 thus structured can achieve the same advantageous effect as the fixing structure 100A.

Second Embodiment

Figure 7:
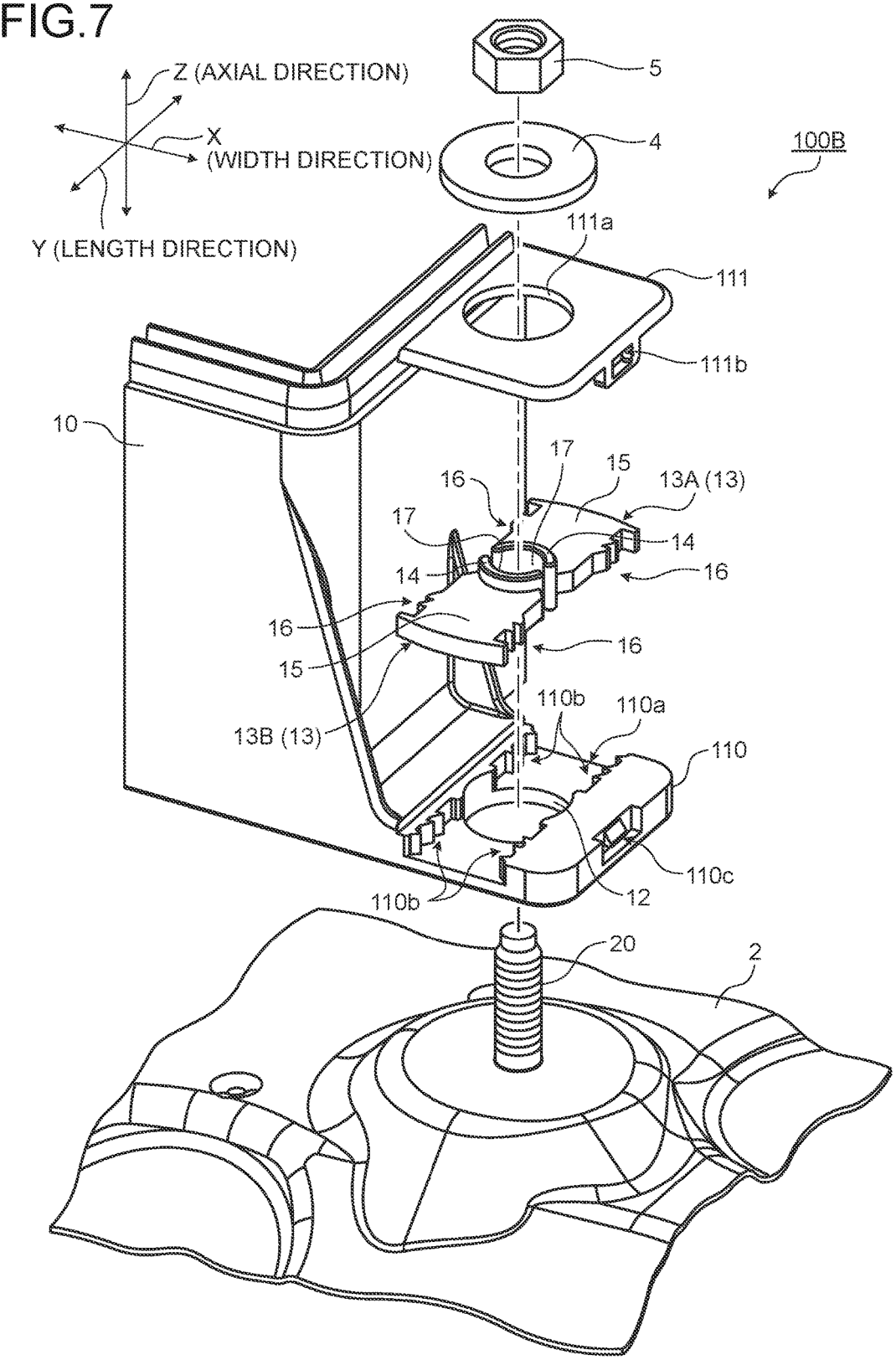
FIG. 7 is an exploded perspective view illustrating a schematic structure of a fixing structure according to a second embodiment.
Figure 8:
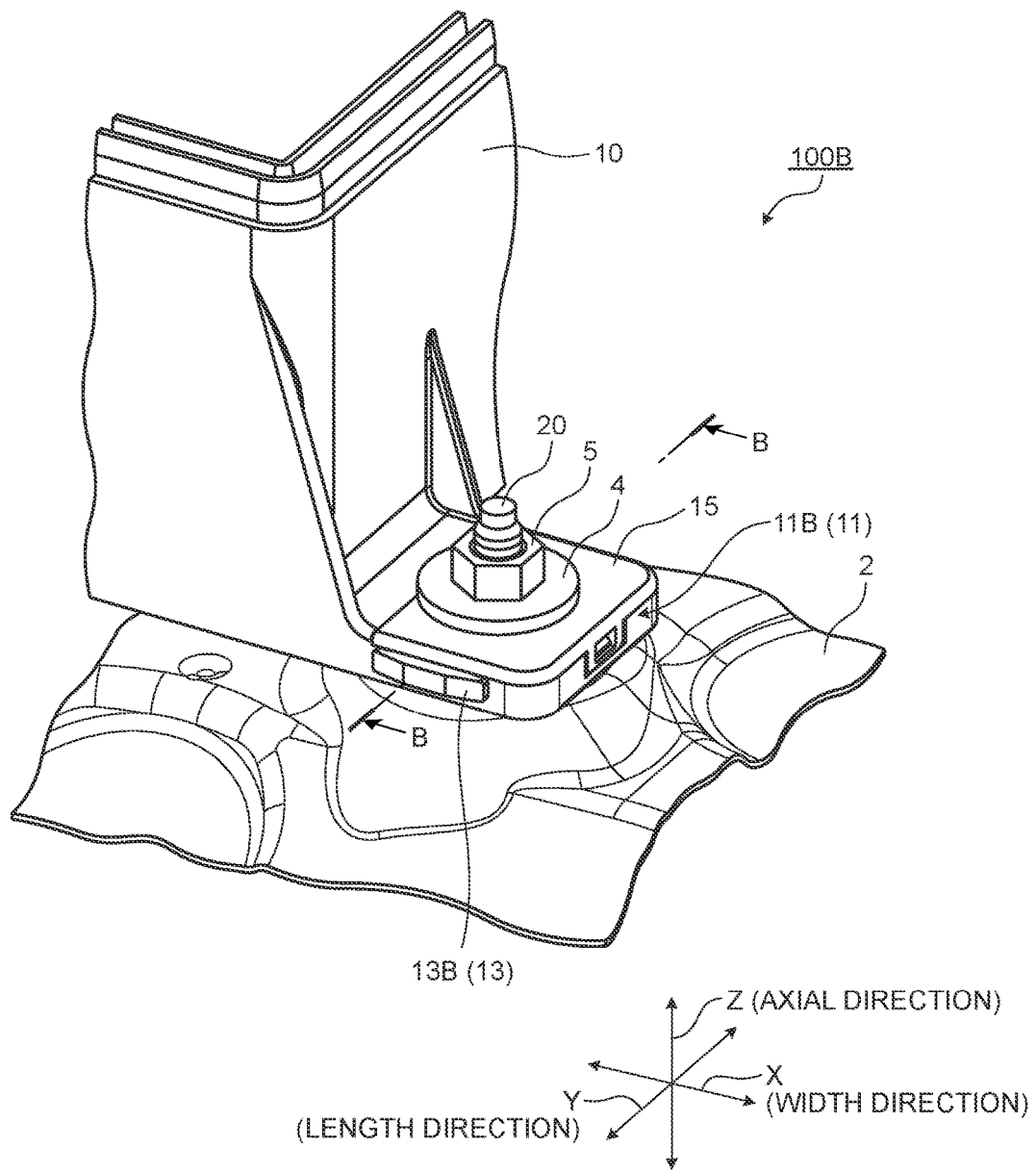
FIG. 8 is a perspective view illustrating the schematic structure of the fixing structure according to the second embodiment.
Figure 9:
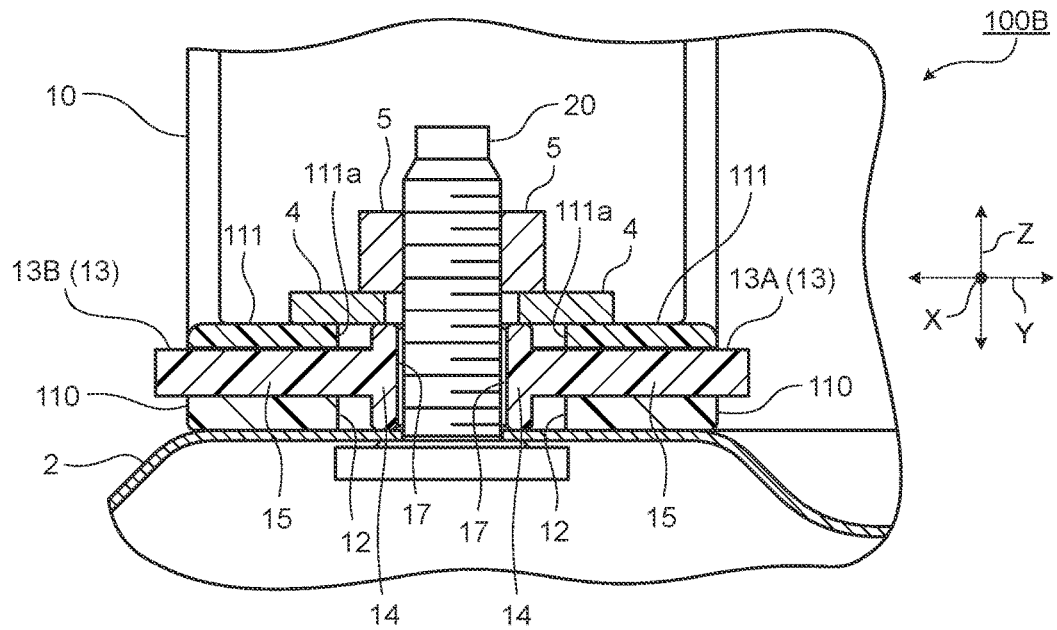
FIG. 9 is a sectional view illustrating the schematic structure of the fixing structure according to the second embodiment.
Figure 10:
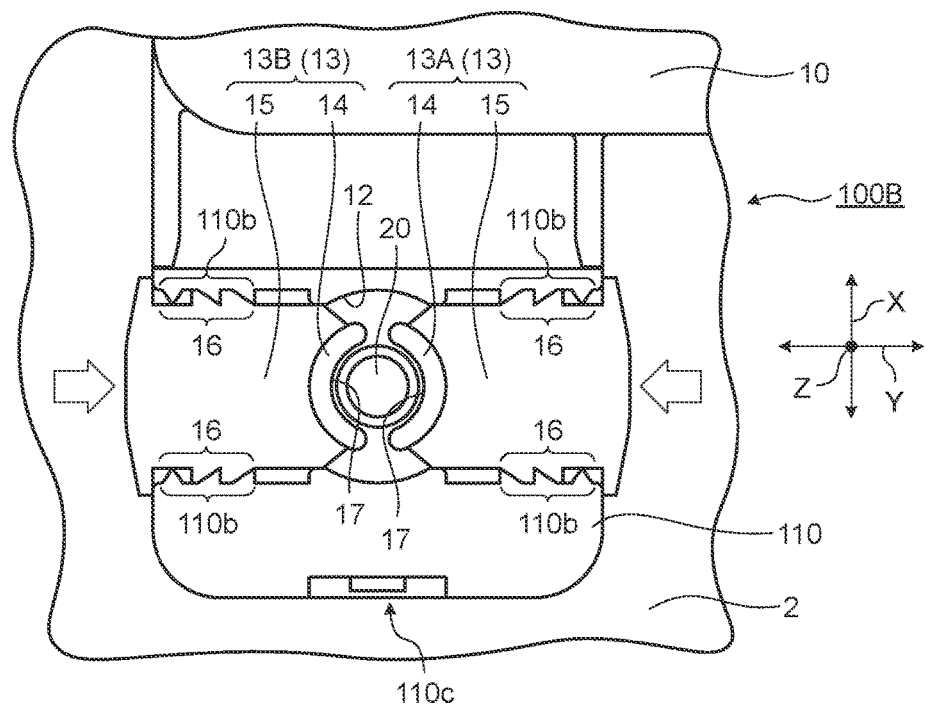
FIG. 10 is a plan view illustrating the schematic structure of the fixing structure according to the second embodiment.
Figure 11:
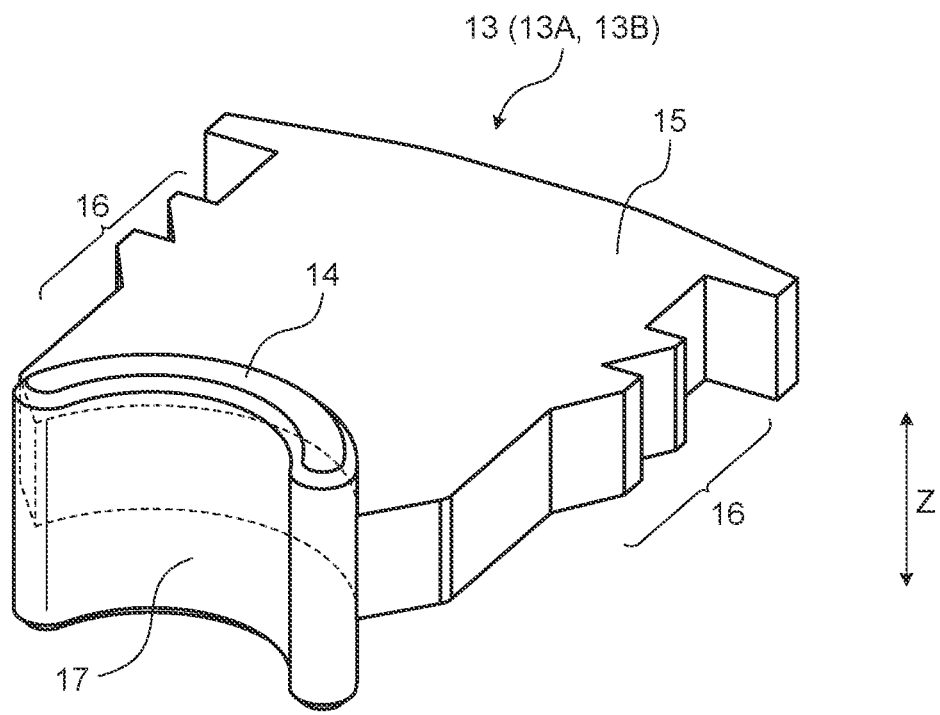
FIG. 11 is a perspective view illustrating a schematic structure of a spacer according to the second embodiment.

With reference to FIGS. 7 to 11, the following describes a fixing structure and an electrical connection box according to a second embodiment. FIG. 7 is an exploded perspective view illustrating a schematic structure of the fixing structure according to the second embodiment. FIG. 8 is a perspective view illustrating the schematic structure of the fixing structure according to the second embodiment. FIG. 9 is a sectional view illustrating the schematic structure of the fixing structure according to the second embodiment. FIG. 10 is a plan view illustrating the schematic structure of the fixing structure according to the second embodiment. FIG. 11 is a perspective view illustrating a schematic structure of a spacer according to the second embodiment. FIG. 9 is a sectional view along line B-B of FIG. 8. FIG. 10 is a schematic diagram illustrating the fixing structure according to the second embodiment viewed from the axial direction of the attaching bolt. FIG. 10 illustrates a state where the attaching bolt, the washer, and a cover are removed.

A fixing structure 100B according to the second embodiment differs in structure from the attaching portion and the spacer in the first embodiment. In the following description, the same constituent elements as the first embodiment are labeled with common numerals, and the descriptions of the structure, operation, and advantageous effect in common with those of the first embodiment are omitted as far as possible. The description after the second embodiment is described in the same manner as described above.

As illustrated in FIGS. 7 to 10, the fixing structure 100B according to the second embodiment includes an attaching portion 11B (11), a pair of spacers 13A (13) and 13B (13), the washer 4, and the nut 5.

The attaching portion 11B (11) includes a main body 110 and a cover 111. The main body 110 is formed by being protruded from a side surface of the housing 10. The main body 110 is attached to the vehicle body 2 serving as the attaching target. The main body 110 includes a groove 110a, saw-teeth portions 110b, a latch projection 110c, and the attaching hole 12. The groove 110a has a rectangular section and extends in the Y direction (length direction) of the main body 110. The groove 110a has the attaching hole 12 formed on the bottom surface thereof. The saw-teeth portions 110b are formed in a saw-teeth shape on both opposite side surfaces of the groove 110a. The latch projection 110c is formed in a projection shape so as to lock the cover 111 to the main body 110. The attaching hole 12 is a through hole in the Z direction, that is, the thickness direction of the main body 110. The attaching bolt 20 provided to the vehicle body 2 is inserted through the attaching hole 12. The cover 111 is set so as to cover a surface on the upper side in the axial direction of the main body 110, that is, the upper surface of the main body 110. The cover 111 has a through hole 111a and a latch hole portion 111b. The attaching bolt 20 is inserted through the through hole 111a. The through hole 111a has substantially the same diameter as the attaching hole 12. The through hole 111a is positioned substantially coaxially with the attaching hole 12 in the axial direction of the attaching hole 12 in a state where the cover 111 is set on the main body 110. The latch hole portion 111b is locked with the latch projection 110c included in the main body 110. The attaching portion 11B (11) in the embodiment houses the pair of spacers 13A and 13B in the groove 110a while the saw-teeth portions 110b of the main body 110 and saw-teeth portions 16 of the pair of spacers 13 are engaged with each other, and is fixed to the vehicle body 2 in such a manner that the nut 5 is tightened to the attaching bolt 20 with the washer 4 interposed between the nut 5 and the attaching portion 11B (11) in a state where the attaching bolt 20 is inserted through the attaching hole 12.

Each spacer 13 is made of a metal such as steel or an aluminum alloy or a synthetic resin. The spacers 13 are arranged at positions facing each other in the horizontal direction perpendicular to the axial direction of the attaching bolt 20 with the attaching bolt 20 interposed therebetween, and supported such that the spacers 13 are capable of moving in directions facing each other. The spacers 13A and 13B have the same shape. The spacers 13 are fitted into the groove 110a of the main body 110 and capable of sliding in the Y direction in the groove 110a. As illustrated in FIG. 11, each spacer 13 is composed of a collar portion 14 and an extending portion 15. The collar portion 14 is disposed between the inner circumferential surface of the attaching hole 12 and the outer circumferential surface of the attaching bolt 20, and is in contact with the vehicle body 2 and the washer 4 in the axial direction of the attaching bolt 20 in a state where the attaching bolt 20 and the nut 5 are tightened. The collar portion 14 has a curved surface 17 in the direction in which the pair of collar portions 14 face each other. The curved surface 17 abuts the outer circumferential surface of the attaching bolt 20 along the outer circumferential surface. The collar portions 14 abut the outer circumferential surface of the attaching bolt 20 from the positions where the curved surfaces 17 face each other with the attaching bolt 20 interposed therebetween. The extending portion 15 is formed such that the extending portion 15 extends in the direction on the side opposite the attaching bolt 20 and protrudes outside the attaching portion 11B (11). The extending portions 15 are fitted into the groove 110a. The saw-teeth portion 16 having a saw-teeth shape is formed on both side surfaces of the extending portion 15 in the X direction. The saw-teeth portions 16 engage with the saw-teeth portions 110b formed on the groove 110a when the extending portions 15 are fitted into the groove 110a. Each spacer 13 is, thus, capable of moving only in the corresponding arrow direction illustrated in FIG. 10. As a result, the movement of each spacer 13 in the direction on the side opposite the attaching bolt 20 is restricted (in a locked state). The saw-teeth portions 16 of the spacers 13 and the saw-teeth portions 110b of the attaching portion 11B (11) form a ratchet mechanism.

The fixing structure 100B and the electrical connection box 1 each include the pair of spacers 13 that are arranged at the positions facing each other in the horizontal direction perpendicular to the axial direction of the attaching bolt 20 with the attaching bolt 20 interposed therebetween, and supported such that they are capable of moving in the directions facing each other. This structure reduces losing the spacers 13 and makes it easy to assemble the spacers 13 to the attaching bolt 20, thereby improving workability in assembly.

In the fixing structure 100B and the electrical connection box 1, the spacers 13 each have the collar portion 14 that is disposed between the inner circumferential surface of the attaching hole 12 and the outer circumferential surface of the attaching bolt 20, and is in contact with the vehicle body 2 and the washer 4 in the axial direction of the attaching bolt 20 in a state where the attaching bolt 20 and the nut 5 are tightened. As a result, the collar portions 14 can firmly receive the axial force generated when the nut 5 is tightened along the axial direction of the attaching bolt 20 while the hole diameter of the attaching hole 12 is large. This structure can prevent the axial force reduction in the tightened portion due to the bending taking place in at least one of the washer 4 and the neck of the attaching bolt 20. The spacers 13 each have the extending portion 15 that extends in the direction on the side opposite the attaching bolt 20 and protrudes outside the attaching portion 11B (11). This structure makes it possible for an operator to easily move the spacer 13 by pushing the end in the extending direction of the spacer 13. As a result, workability can be improved.

In the fixing structure 100B and the electrical connection box 1, the collar portions 14 each have the curved surface 17 that abuts the outer circumferential surface of the attaching bolt 20 along the outer circumferential surface in a mutually opposed direction. This structure makes it possible for the collar portions 14 to firmly receive the axial force generated when the nut 5 is tightened along the outer circumferential surface of the attaching bolt 20 in the axial direction. This structure can prevent the axial force reduction due to the bending of the washer 4, for example.

In the fixing structure 100B and the electrical connection box 1, the saw-teeth portions 16 of the spacers 13 and the saw-teeth portions 110b of the attaching portion 11B (11) form a ratchet mechanism. The ratchet mechanism can easily control the movement directions of the spacers 13, thereby reducing the position shifts of the collar portions 14 and the falling of the spacers 13. As a result, workability can be improved.

The fixing structure 100B described above includes the attaching portion 11B (11), the nut 5, and the pair of spacers 13. The attaching portion 11B (11) has the attaching hole 12 through which the attaching bolt 20 provided to the vehicle body 2 is inserted. The nut 5 fixes the attaching portion 11B (11) to the vehicle body 2 by being tightened to the attaching bolt 20 with the washer 4 interposed between the nut 5 and the attaching portion 11B (11). The spacers 13 are arranged at the positions facing each other in the horizontal direction perpendicular to the axial direction of the attaching bolt 20 with the attaching bolt 20 interposed therebetween, and are supported such that they are capable of moving in the directions facing each other. Each spacer 13 is composed of the collar portion 14 and the extending portion 15. The collar portion 14 is disposed between the inner circumferential surface of the attaching hole 12 and the outer circumferential surface of the attaching bolt 20, and is in contact with the vehicle body 2 and the washer 4 in the axial direction of the attaching bolt 20 in a state where the attaching bolt 20 and the nut 5 are tightened. The extending portion 15 extends in a direction on the side opposite the attaching bolt 20 and protrudes outside the attaching portion 11B (11). Each collar portion 14 has the curved surface 17 in the direction in which the pair of collar portions 14 face each other. The curved surface 17 abuts the outer circumferential surface of the attaching bolt 20.

The fixing structure 100B thus structured allows the collar portions 14 of the spacers 13 to firmly receive the axial force generated when the nut 5 is tightened along the axial direction of the attaching bolt 20, thereby making it possible to prevent axial force reduction due to the bending of the washer 4, for example, even when the hole diameter of the attaching hole 12 is large. In addition, it is unnecessary to newly provide a special nut having a wide width across flats or reinforce the neck of the attaching bolt 20 to prevent axial force reduction in the tightened portion and the buckling of the seating surface on the attaching portion 11B (11), thereby making it possible to prevent an increase in cost.

The electrical connection box 1 described above includes the housing 10, the attaching portion 11B (11), the nut 5, and the pair of spacers 13. The attaching portion 11B (11) is protruded from the housing 10 and has the attaching hole 12 through which the attaching bolt 20 provided to the vehicle body 2 is inserted. The nut 5 fixes the attaching portion 11B (11) to the vehicle body 2 by being tightened to the attaching bolt 20 with the washer 4 interposed between the nut 5 and the attaching portion 11B (11). The spacers 13 are arranged at the positions facing each other in the horizontal direction perpendicular to the axial direction of the attaching bolt 20 with the attaching bolt 20 interposed therebetween, and are supported such that they are capable of moving in the directions facing each other. Each collar portion 13 is composed of the collar portion 14 and the extending portion 15. The collar portion 14 is disposed between the inner circumferential surface of the attaching hole 12 and the outer circumferential surface of the attaching bolt 20, and is in contact with the vehicle body 2 and the washer 4 in the axial direction of the attaching bolt 20 in a state where the attaching bolt 20 and the nut 5 are tightened. The extending portion 15 extends in a direction on the side opposite the attaching bolt 20 and protrudes outside the attaching portion 11B (11). Each collar portion 14 has the curved surface 17 in the direction in which the pair of collar portions 14 face each other. The curved surface 17 abuts the outer circumferential surface of the attaching bolt 20.

The electrical connection box 1 thus structured can achieve the same advantageous effect as the fixing structure 100B.

Third Embodiment

Figure 12:
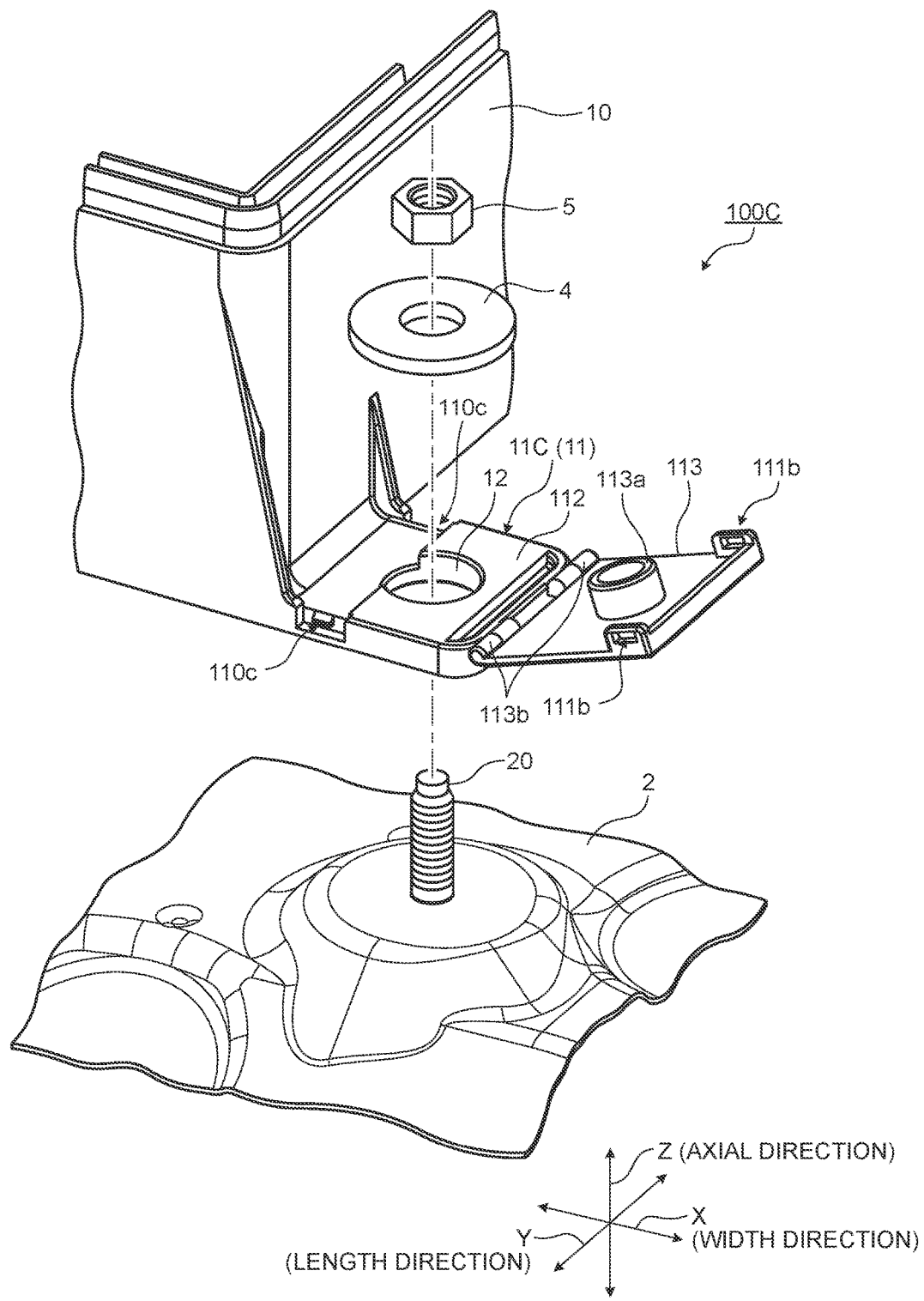
FIG. 12 is an exploded perspective view illustrating a schematic structure of a fixing structure according to a third embodiment.
Figure 14:
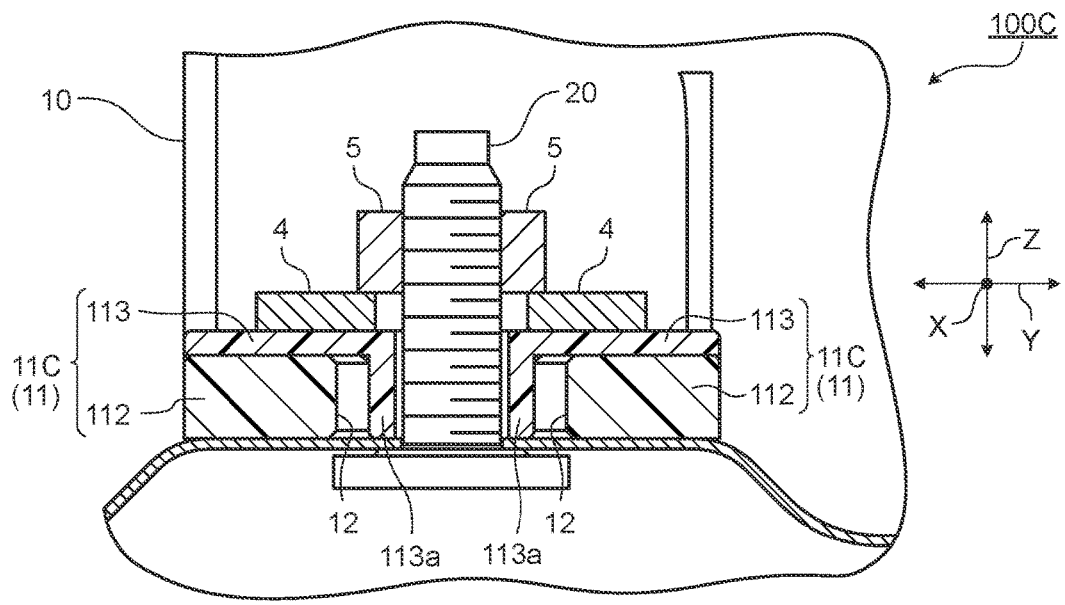
FIG. 14 is a sectional view illustrating the schematic structure of the fixing structure according to the third embodiment.

With reference to FIGS. 12 to 14, the following describes a fixing structure and an electrical connection box according to a third embodiment. FIG. 12 is an exploded perspective view illustrating a schematic structure of the fixing structure according to the third embodiment. FIG. 13 is a perspective view illustrating the schematic structure of the fixing structure according to the third embodiment. FIG. 14 is a sectional view illustrating the schematic structure of the fixing structure according to the third embodiment. FIG. 14 is a sectional view along line C-C of FIG. 13.

A fixing structure 100C according to the third embodiment differs in structure from the attaching portions and the spacers in the first and the second embodiments.

As illustrated in FIGS. 12 to 14, the fixing structure 100C according to the third embodiment includes an attaching portion 11C (11), the washer 4, and the nut 5.

The attaching portion 11C (11) includes a main body 112 and a cover 113. The main body 112 is formed by being protruded from a side surface of the housing 10. The main body 112 is attached to the vehicle body 2 serving as the attaching target. The main body 112 includes the attaching hole 12 and two latch projections 110c. The latch projection 110c is formed on both side surfaces of the main body 112 in the Y direction. The cover 113 is made of a metal such as steel or an aluminum alloy or a synthetic resin. The cover 113 is coupled to the main body 112 with hinges 113b interposed therebetween. The cover 113 includes a collar portion 113a and two latch hole portions 111b. The collar portion 113a is disposed between the inner circumferential surface of the attaching hole 12 and the outer circumferential surface of the attaching bolt 20, and is in contact with the vehicle body 2 and the washer 4 in the axial direction of the attaching bolt 20 in a state where the attaching bolt 20 and the nut 5 are tightened. The latch hole portion 111b is formed on both side surfaces of the cover 113 in the Y direction. The latch hole portions 111b are locked with the latch projections 110c of the main body 112 in a state where the cover 113 is rotated around the hinges 113b serving as pivot points and closed to cover the main body 112 from above.

In the fixing structure 100C and the electrical connection box 1, the cover 113 is coupled to the main body 112 with the hinges 113b interposed therebetween. This structure reduces losing the collar portion 113a and makes it easy to assemble the collar portion 113a to the attaching bolt 20. As a result, workability in assembly is improved.

In the fixing structure 100C and the electrical connection box 1, the cover 113 has the collar portion 113a that is disposed between the inner circumferential surface of the attaching hole 12 and the outer circumferential surface of the attaching bolt 20, and is in contact with the vehicle body 2 and the washer 4 in the axial direction of the attaching bolt 20 in a state where the attaching bolt 20 and the nut 5 are tightened. As a result, the collar portion 113a can firmly receive the axial force generated when the nut 5 is tightened along the axial direction of the attaching bolt 20 while the hole diameter of the attaching hole 12 is large. This structure makes it possible to prevent axial force reduction due to the bending taking place in at least one of the washer 4 and the neck of the attaching bolt 20.

Modification

Figure 15:
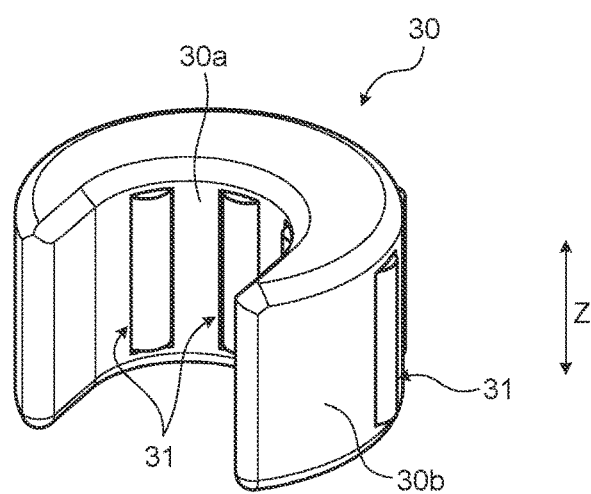
FIG. 15 is a perspective view illustrating a schematic structure of a spacer according to a modification of the first embodiment.

FIG. 15 is a perspective view illustrating a schematic structure of a spacer according to a modification of the first embodiment. A spacer 30 in the modification has more improved rotating property in terms of rotation around the shaft of the attaching bolt 20 than that of the spacer 3 in the first embodiment. Specifically, the spacer 30 has rolling bearings 31 on at least one of the cylindrical inner circumferential surface and the cylindrical outer circumferential surface thereof. The spacer 30 rotates around the axial direction of the attaching bolt 20 with the rolling bearings 31 interposed between the spacer 30 and the attaching bolt 20. The rolling bearings 31 may be needle bearings as illustrated in FIG. 15. The rolling bearings 31 may be ball bearings.

The fixing structure 100A according to the modification of the first embodiment includes the spacer 30 that has the rolling bearings 31 on at least one of the cylindrical inner circumferential surface 30a and the cylindrical outer circumferential surface 30b thereof and rotates around the axial direction of the attaching bolt 20 with the rolling bearings 31 interposed between the spacer 30 and the attaching bolt 20. This structure makes it easy for the spacer 30 to rotate around the axial direction of the attaching bolt 20 in a state where the spacer 30 is assembled to the attaching bolt 20, thereby making it possible to easily absorb a position shift between the attaching bolt 20 and the attaching hole 12 in the horizontal direction.

The hinge 113b, which couples the cover 113 and the main body 112, preferably has a backlash in the X and the Y directions. The hinge 113b having a backlash can easily absorb a shift between the attaching bolt 20 and the attaching hole 12 in the horizontal direction.

The embodiment has an advantageous effect of preventing axial force reduction in the tightened portion even when a hole diameter of the attaching hole is large.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A fixing structure comprising:
an attaching portion that has an attaching hole through which an attaching bolt is inserted, wherein the attaching bolt is provided to an attaching target;
a nut that is tightened to the attaching bolt with a washer interposed between the nut and the attaching portion to fix the attaching portion to the attaching target; and
a spacer that is disposed between an inner circumferential surface of the attaching hole and an outer circumferential surface of the attaching bolt, and is in contact with the attaching target and the washer in an axial direction of the attaching bolt in a state where the attaching bolt and the nut are tightened, wherein
the spacer has an opening formed in a U-shape on a cylindrical side surface thereof and is capable of rotating around the axial direction of the attaching bolt in accordance with a change in degree of a position shift between the attaching bolt and the attaching hole in a state where the attaching bolt is inserted into the opening.

2. The fixing structure according to claim 1, wherein
the spacer has a rolling bearing on at least one of a cylindrical inner circumferential surface and a cylindrical outer circumferential surface thereof, and rotates around the axial direction of the attaching bolt with the rolling bearing interposed between the spacer and the attaching bolt.

3. A fixing structure comprising: an attaching portion that has an attaching hole through which an attaching bolt is inserted, wherein the attaching bolt is provided to an attaching target: a nut that is tightened to the attaching bolt with a washer interposed between the nut and the attaching portion to fix the attaching portion to the attaching target; and a pair of spacers that are arranged at positions facing each other in a horizontal direction perpendicular to an axial direction of the attaching bolt with the attaching bolt interposed between the pair of spacers, and are supported such that the pair of spacers are capable of moving-being slid on the attaching portion in directions facing each other, wherein each of said spacers of the pair of spacers includes: a collar portion that is disposed between an inner circumferential surface of the attaching hole and an outer circumferential surface of the attaching bolt, and is in contact with the attaching target and the washer in the axial direction of the attaching bolt in a state where the attaching bolt and the nut are tightened, and an extending portion that extends in a direction to a side opposite the attaching bolt and protrudes outside the attaching portion, and each of said collar portions has a curved surface in a mutually opposed direction, the curved surface abutting the outer circumferential surface of the attaching bolt along the outer circumferential surface.

4. An electrical connection box comprising:
   a housing;
   an attaching portion that is protruded from the housing and has an attaching hole through which an attaching bolt is inserted, wherein the attaching bolt is provided to an attaching target;
   a nut that is tightened to the attaching bolt with a washer interposed between the nut and the attaching portion to fix the attaching portion to the attaching target; and
   a spacer that is disposed between an inner circumferential surface of the attaching hole and an outer circumferential surface of the attaching bolt, and is in contact with the attaching target and the washer in an axial direction of the attaching bolt in a state where the attaching bolt and the nut are tightened, wherein
   the spacer has an opening formed in a U-shape on a cylindrical side surface thereof and is capable of rotating around the axial direction of the attaching bolt in accordance with a change in degree of a position shift between the attaching bolt and the attaching hole in a state where the attaching bolt is inserted into the opening.

5. An electrical connection box comprising: a housing;
   an attaching portion that is protruded from the housing and has an attaching hole through which an attaching bolt is inserted, wherein the attaching bolt is provided to an attaching target; a nut that is tightened to the attaching bolt with a washer interposed between the nut and the attaching portion to fix the attaching portion to the attaching target; and a pair of spacers that are arranged at positions facing each other in a horizontal direction perpendicular to an axial direction of the attaching bolt with the attaching bolt interposed between the pair of spacers, and are supported such that the spacers are capable of being slid on the attaching portion in directions facing each other, wherein each of said spacers of the pair of spacers includes:
   a collar portion that is disposed between an inner circumferential surface of the attaching hole and an outer circumferential surface of the attaching bolt, and is in contact with the attaching target and the washer in the axial direction of the attaching bolt in a state where the attaching bolt and the nut are tightened, and an extending portion that extends in a direction to a side opposite the attaching bolt and protrudes outside the attaching portion, and each of said collar portions has a curved surface in a mutually opposed direction, the curved surface abutting the outer circumferential surface of the attaching bolt along the outer circumferential surface.

* * * * *